United States Patent
Kim et al.

(10) Patent No.: US 12,503,568 B2
(45) Date of Patent: Dec. 23, 2025

(54) CONDUCTIVE MATERIAL WITH HIGH STRETCHABILITY AND PREPARATION METHOD THEREOF

(71) Applicant: KOREA INSTITUTE OF SCIENCE AND TECHNOLOGY, Seoul (KR)

(72) Inventors: Heesuk Kim, Seoul (KR); Doo Joon Jang, Seoul (KR); Tae Ann Kim, Seoul (KR); Jae Hong Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 18/598,918

(22) Filed: Mar. 7, 2024

(65) Prior Publication Data
US 2025/0215189 A1    Jul. 3, 2025

(30) Foreign Application Priority Data
Dec. 27, 2023   (KR) .................. 10-2023-0193698

(51) Int. Cl.
C08K 3/04        (2006.01)
C08J 3/20        (2006.01)

(52) U.S. Cl.
CPC .............. *C08K 3/041* (2017.05); *C08J 3/203* (2013.01); *C08J 2333/02* (2013.01); *C08K 2201/001* (2013.01)

(58) Field of Classification Search
CPC .... C08K 3/041; C08K 2201/001; C08J 3/203; C08J 2333/02; C08J 5/18; H01B 1/24; H01B 1/04; H01B 5/14; C09D 11/52
See application file for complete search history.

(56) References Cited

U.S. PATENT DOCUMENTS

| | | | |
|---|---|---|---|
| 9,892,821 B2 | 2/2018 | Sohn et al. | |
| 10,002,927 B2 | 6/2018 | Woo et al. | |
| 2017/0200527 A1 | 7/2017 | Pujar et al. | |
| 2017/0222151 A1* | 8/2017 | Riquelme | H10K 85/141 |
| 2018/0308604 A1* | 10/2018 | Liang | B82Y 30/00 |
| 2019/0019936 A1* | 1/2019 | Imai | H02N 11/00 |
| 2019/0185684 A1 | 6/2019 | Yamada et al. | |
| 2020/0052180 A1* | 2/2020 | Hayashi | H10N 10/01 |
| 2025/0067603 A1* | 2/2025 | Suzuki | H10N 10/855 |

FOREIGN PATENT DOCUMENTS

| KR | 10 20120035841 | 4/2012 |
|---|---|---|
| KR | 10 20130046100 | 5/2013 |
| KR | 10-1394506 B1 | 5/2014 |
| KR | 10 20170055361 | 5/2017 |
| KR | 10 20170081575 | 7/2017 |

\* cited by examiner

*Primary Examiner* — Mark Kopec
*Assistant Examiner* — Jaison P Thomas
(74) *Attorney, Agent, or Firm* — LEYDIG, VOIT & MAYER, LTD.

(57) ABSTRACT

The present invention relates to a conductive material with high stretchability and a method for preparing the conductive material, and more particularly, to a conductive material with high stretchability, including a carbon nanotube (CNT) network, and a polymer dopant, not an elastomer, providing an increase in free-volume of the carbon nanotube (CNT) network, wherein the conductive material includes the polymer dopant in an amount of 1 wt % to less than 30 wt % with respect to the total weight of the carbon nanotubes (CNTs) and has stretchability.

15 Claims, 8 Drawing Sheets

CONDUCTIVE MATERIAL WITH HIGH STRETCHABILITY AND PREPARATION METHOD THEREOF

CROSS-REFERENCES TO RELATED APPLICATION

This patent application claims the benefit of priority from Korean Patent Application No. 10-2023-0193698, filed on Dec. 27, 2023, the contents of which are incorporated herein by reference.

BACKGROUND OF THE INVENTION

1. Field of the Invention

The present disclosure relates to a conductive material with high stretchability and a method for preparing the same.

2. Description of the Related Art

Stretchable electronic devices having bendable and stretchable properties overcome the limitations of typical inorganic-based semiconductor electronic devices to be applicable as recently emerging wearable devices that are attached to or worn on a people's skin or curved parts, easy-to-carry displays, energy storage devices, and bio-signal sensors, leading to a growing need for the development of technologies concerning related materials and elements.

In order to implement such stretchable electronic devices, various methods of newly designing components of elements to effectively respond to external forces and strains applied to the elements and to maintain element performance have been explored lately.

As part of this effort, Korean Patent Registration No. 10-1394506 has disclosed a stretchable thin-film transistor including a stretchable substrate, graphene electrodes, a wrinkled inorganic oxide insulating film, and a carbon nanotube channel, but comes with a downside in that the performance of a final electronic device is limited to the stretchable performance of the electrode material, that is, graphene. In response, the flexibility and stretchability of electrodes need to be improved to make sure that the final stretchable electronic device has excellent flexibility and stretchability, and accordingly, there is a demand for research and development on stretchable conductive materials.

The stretchable conductive materials are favorable as they are able to be attached to moving parts and any arbitrarily shaped surface while maintaining constant electrical conductivity despite mechanical deformation. Thus, they can be applied to areas such as displays and wearable electronic devices, and other than the applications requiring constant electrical conductivity against mechanical deformation, the materials are applicable as tactile sensing films using the property of electrical resistance changing with mechanical deformation and thus be applied to areas such as artificial electronic skin, tactile sensors, prosthetics, and robotics.

In relation to this, US 2017-0200527 A1 has disclosed an interconnect material having stretchability and conductivity with the addition of metal particles and additives helping disperse the metal particles to a polyester polymer, and US 2019-0185684 A1 has disclosed a method for preparing a conductive paste by mixing metal nanoparticles surrounded by organic substances containing amino groups with a cellulose-based resin.

The present invention has identified a novel conductive material with high stretchability, in which excellent conductivity, stretchability, and stretch stability are obtained by adding a polymer dopant that increases the free-volume of the CNT to carbon nanotubes (CNTs) having excellent conductivity, and thus has been completed.

SUMMARY OF THE INVENTION

One objective of the present invention is to provide a conductive material with high stretchability and a method for preparing the same.

In order to achieve the objective, an aspect provides a conductive material with high stretchability including:

a carbon nanotube (CNT) network; and a polymer dopant, not an elastomer, providing an increase in free-volume of the carbon nanotube (CNT) network, wherein the conductive material includes the polymer dopant in an amount of 1 wt % to less than 30 wt % with respect to the total weight of the carbon nanotubes (CNTs) and has stretchability.

In this case, the polymer dopant dopes the carbon nanotubes (CNTs) into N-type or P-type.

The polymer dopant, as a P-type dopant, may be at least one of polyacrylic acid (PAA) or polyamide (PA), or as an N-type dopant, may be at least one of polyethylenimine (PEI), polyvinylpyrrolidone (PVP), poly(4-vinylpyridine) (PVPy), or tetronic polymer.

In addition, the polymer dopant may have a molecular weight of 1 KDa to 10,000 KDa, preferably a molecular weight of 1 KDa to 100 KDa.

The composition may further include an ionic liquid (IL).

The composition may include the ionic liquid (IL) in an amount of 1 wt % to 20 wt % with respect to the total weight of the carbon nanotubes (CNTs).

The ionic liquid may be at least one selected from the group consisting of 1-ethyl-3-methylimidazolium bis(trifluoromethylsulfonyl)imide ([EMI][TFSI]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), 1-butyl-1-methylpyrrolidinium bis(trifluoromethylsulfonyl)imide ([BMPYR][TFSI]), 1-butyl-1-methylpyrrolidinium tris(pentafluoroethyl)trifluorophosphate ([BMPYR][FAP]), 1-ethyl-3-methylimidazolium tris(pentafluoroethyl)trifluorophosphate ([EMI][FAP]), 1-ethyl-3-methylimidazolium bis(fluorosulfonyl)imide ([EMI][FSI]), and ethyl-dimethyl-propylammotium bis(trifluoromethylsulfonyl)imide ([EDMPA][TFSI]).

The conductive material with high stretchability may be in the form of ink dispersed in an organic solvent.

The conductive material with high stretchability may be in the form of a film.

Another aspect provides a stretchable electrode including the conductive material with high stretchability.

Yet another aspect provides a thermoelectric material with high stretchability, including the conductive material with high stretchability.

Yet another aspect provides a method for preparing a conductive material with high stretchability, including hybridizing a carbon nanotube (CNT) network and a polymer dopant, not an elastomer, providing an increase in free-volume of the carbon nanotube (CNT) network, wherein the method prepares the conductive material with high stretchability.

The hybridizing may involve dispersing the carbon nanotube (CNT) network and the polymer dopant in an organic solvent.

The method may further include forming the resulting mixture on a substrate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described with reference to the accompanying drawings. The present invention may, however, be embodied in many different forms and should not be construed as being limited to the embodiments set forth herein. In addition, these embodiments of the present invention are provided so that the present invention will be thorough and complete, and will fully convey the scope of the invention to those skilled in the art. Moreover, throughout the entire description of the present invention, when one part is said to "include (or comprise)" an element, unless specifically mentioned otherwise, instead of excluding any other element, this may signify that the one part may further include other elements.

In an aspect, provided is a conductive material including: a carbon nanotube (CNT) network; and a polymer dopant, not an elastomer, providing an increase in free-volume of the carbon nanotube (CNT) network, wherein the conductive material comprises the polymer dopant in an amount of 1 wt % to less than 30 wt % with respect to the total weight of the carbon nanotubes (CNTs), and has stretchability.

The conductive material with high stretchability according to an embodiment includes the polymer dopant that increases the free-volume of the carbon nanotube (CNT) network, and thus has excellent electrical conductivity and stretchability.

Figure 1:
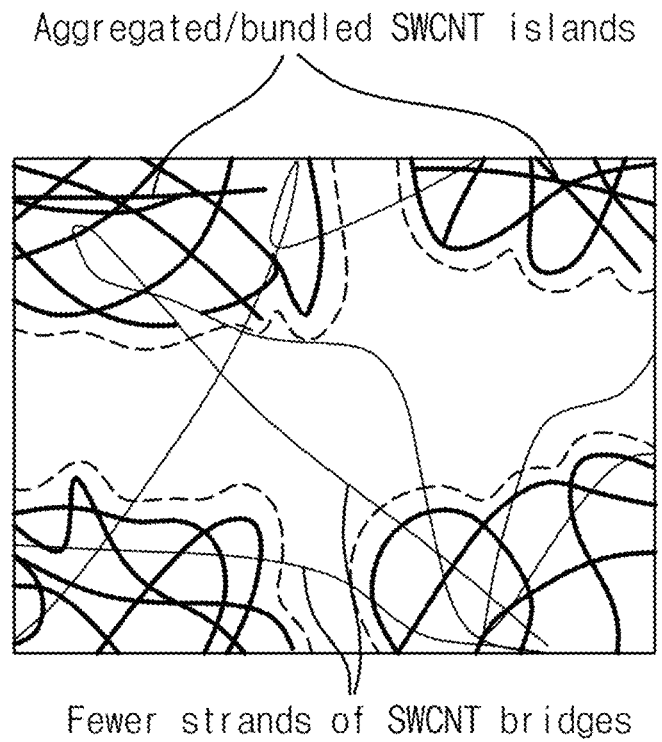
FIG. 1 is a view schematically showing a state before stretching of a conductive film including a carbon nanotube (CNT) network according to Comparative Example 1.
Figure 2:
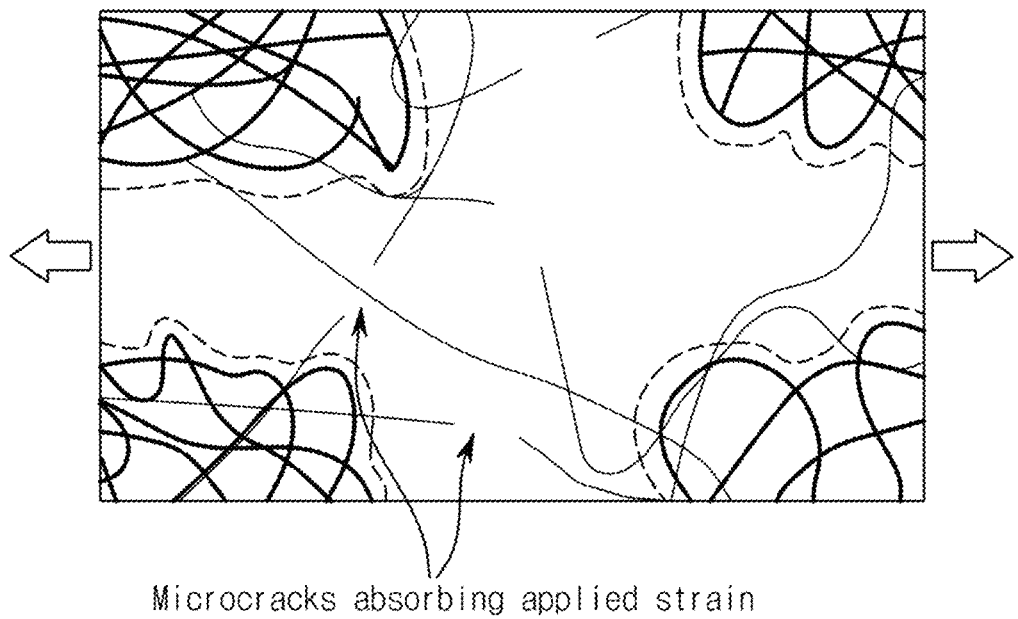
FIG. 2 is a view schematically showing a state after stretching of a conductive film including a carbon nanotube (CNT) network according to Comparative Example 1.
Figure 3:
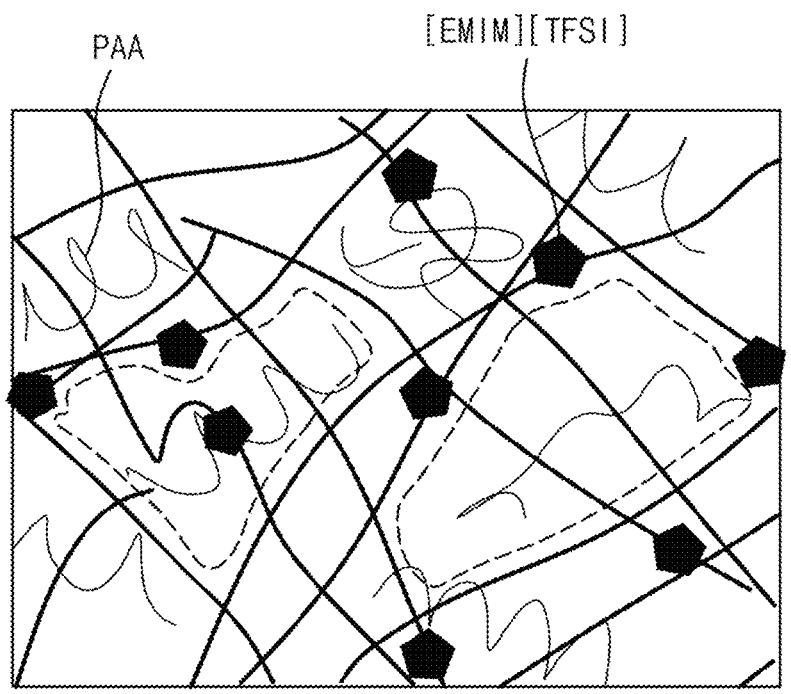
FIG. 3 is a view schematically showing a state before stretching of a conductive film according to Example 2 or Example 4.
Figure 4:
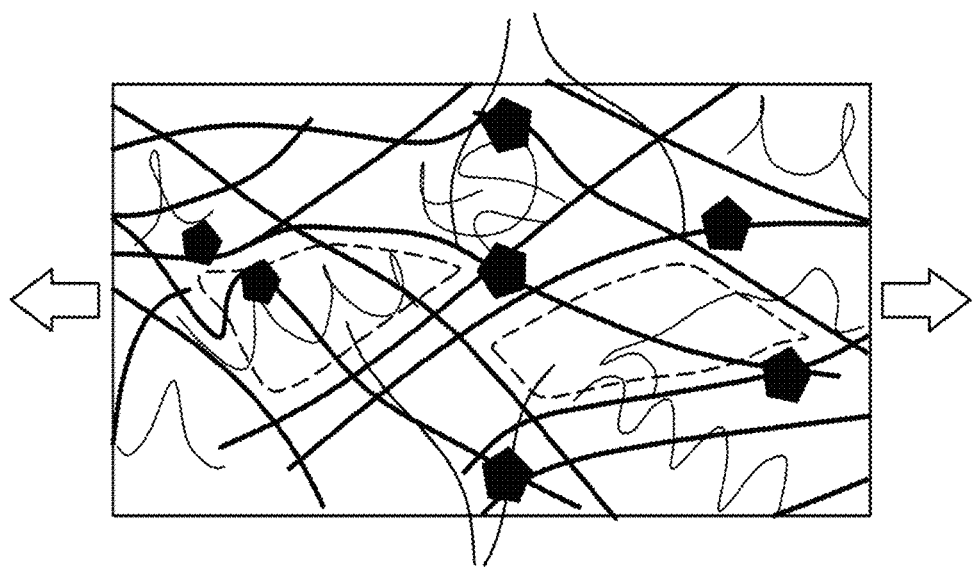
FIG. 4 is a view schematically showing a state after stretching of a conductive film according to Example 2 or Example 4.

FIGS. 1 and 2 are views schematically showing before (FIG. 1) and after (FIG. 2) stretching of a conductive film (Pristine CNT film) containing only carbon nanotubes (CNTs), and FIGS. 3 and 4 are views schematically showing before (FIG. 1) and after (FIG. 2) stretching of the conductive material according to an embodiment.

As shown in FIGS. 1 and 2, as for the conductive film containing only carbon nanotubes (CNTs), aggregated carbon nanotube bundles are connected through a small number of carbon nanotube strands, so that when the film is stretched, the small number of carbon nanotube strands are disconnected to generate cracks, resulting in a drastic decline in electrical conductivity. Meanwhile, as shown in FIGS. 3 and 4, the conductive material according to an embodiment comes with an increase in free-volume of a carbon nanotube (CNT) network due to the addition of a polymer dopant, and thus cracks are less generated even after stretching, resulting in improvements in electrical conductivity and reduction in electrical resistance changes resulting from stretching.

In addition, the aggregation extent of the carbon nanotube (CNT) network may be reduced by further including an ionic liquid to improve electrical conductivity and reduce changes in electrical resistance resulting from stretching, and moreover, the effect of increasing the free-volume of the carbon nanotube (CNT) network may be increased by controlling the molecular weight of a polymer dopant to improve electrical conductivity and reduce changes in electrical resistance resulting from stretching.

Accordingly, the conductive material with high stretchability according to an embodiment may be applied to flexible devices such as flexible electronic devices, wearable electronic devices, and smart sensors. For example, the conductive material with high stretchability may be used as a stretchable electrode for flexible devices or stretchable devices.

Hereinafter, the conductive material with high stretchability according to an embodiment will be described in detail for respective components.

The conductive material according to an embodiment includes a carbon nanotube (CNT) network.

In this case, the "carbon nanotube (CNT) network" indicates a plurality of carbon nanotubes forming a random conductive network.

In this case, the carbon nanotubes may be single-walled carbon nanotubes, double-walled carbon nanotubes, multi-walled carbon nanotubes, thin multi-walled carbon nanotubes, bundled carbon nanotubes, and the like, but may preferably be single-walled carbon nanotubes (SWCNTs) having a lower resistance value.

The conductive material according to an embodiment includes a carbon nanotube (CNT) network and a polymer dopant that may improve the free-volume of the network.

The conductive material according to an embodiment is formed by hybridizing carbon nanotubes (CNTs) and polymer dopants, and in this case, the polymer dopants are not elastomers, but increase the free-volume of the carbon nanotubes (CNTs) network.

Typical stretchable materials are based on elastomers and include carbon nanotubes as fillers in the elastomers, and thus have stretchability but have greatly reduced conductivity. Meanwhile, the conductive material according to an embodiment is based on the carbon nanotube (CNT) network and includes a polymer dopant that increases the free-volume of the carbon nanotube (CNT) network not an elastomer, thereby providing both improved stretchability and conductivity.

The conductive material according to an embodiment is one that significantly reduces the increase in electrical resistance resulting from stretching of the carbon nanotube (CNT) network, and thus have significantly improved stretchable properties as a conductive material.

The polymer dopant is preferably contained in an amount of less than 30 wt %, preferably 1 wt % to less than 20 wt %, with respect to the total weight of the carbon nanotubes (CNTs).

When the polymer dopant is included in an amount of less than 1 wt %, the effect of improving the free-volume of carbon nanotubes may be insignificant, resulting in no or little effect on improving stretchability, and when the polymer dopant is included in an amount of 30 wt % or greater, the overall electrical properties may be governed by the properties of a polymer rather than carbon nanotubes.

In addition, the polymer dopant may preferably be a dopant that dopes the carbon nanotubes (CNTs) N-type or P-type.

The polymer dopant increases the free-volume of the carbon nanotube (CNT) network while increasing the carrier concentration and mobility of the carbon nanotube, and thus allows the conductive material according to an embodiment to have improved electrical conductivity along with stretchability.

The polymer dopant may be a crystalline polymer or an amorphous polymer that dopes the carbon nanotubes (CNTs) N-type or P-type.

Accordingly, the polymer dopant may be at least one of polyacrylic acid (PAA), polyamide (PA), polyethylenimine (PEI), polyvinylpyrrolidone (PVP), poly(4-vinylpyridine) (PVPy), or tetronic polymer.

In this case, polyacrylic acid (PAA) and polyamide (PA) above may dope the carbon nanotubes (CNTs) P-type, with an increase in free-volume of the carbon nanotubes (CNTs) network, and polyethylenimine (PEI), polyvinylpyrrolidone (PVP), poly(4-vinylpyridine) (PVPy), and tetronic polymer above may dope the carbon nanotubes (CNTs) N-type, with an increase in free-volume of the carbon nanotubes (CNTs) network.

In addition, the conductive material according to an embodiment includes a polymer having a relatively small high molecular weight as the polymer dopant, and may thus further improve the effect of increasing the free-volume of the carbon nanotube (CNT) network, resulting in further improvement in stretchability of the conductive material.

Accordingly, the polymer dopant may have a molecular weight of preferably 10,000 kDa or less, preferably 5,000 kDa or less, preferably 1,000 kDa or less, preferably 300 kDa or less, preferably 100 kDa or less, preferably 50 kDa or less, preferably 10 kDa or less, preferably 5 kDa or less.

Accordingly, the polymer dopant may have a molecular weight of 1 kDa to 10,000 kDa, may have a molecular weight of 1 kDa to 100 kDa, may have a molecular weight of 1 kDa to 5 kDa, and may have a molecular weight of 1 KDa to 2.5 kDa.

Meanwhile, the conductive material according to an embodiment may further include an ionic liquid (IL).

The conductive material according to an embodiment further includes the ionic liquid (IL), and may thus prevent the carbon nanotube (CNT) network from agglomerating, thereby further improving the stretchability and conductivity of a conductive material formed from the composition.

The ionic liquid (IL) may be included in an amount of 1 wt % to 20 wt %, preferably 15 wt %, with respect to the total weight of the carbon nanotubes (CNTs).

When the ionic liquid (IL) is contained in less than 1 wt %, the addition of the ionic liquid (IL) may result in no or little improvement in stretchability and conductivity, and when the ionic liquid (IL) is contained in an amount of 20 wt % or greater, there may be a reduction in electrical conductivity.

In this case, the ionic liquid may be at least one selected from the group consisting of 1-ethyl-3-methylimidazolium bis(trifluoromethylsulfonyl)imide ([EMI][TFSI]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), 1-butyl-1-methylpyrrolidinium bis(trifluoromethylsulfonyl)imide ([BMPYR][TFSI]), 1-butyl-1-methylpyrrolidinium tris(pentafluoroethyl)trifluorophosphate ([BMPYR][FAP]), 1-ethyl-3-methylimidazolium tris(pentafluoroethyl)trifluorophosphate ([EMI][FAP]), 1-ethyl-3-methylimidazolium bis(fluorosulfonyl)imide ([EMI][FSI]), and ethyl-dimethyl-propylammotium bis(trifluoromethylsulfonyl)imide ([EDMPA][TFSI]), preferably 1-ethyl-3-methylimidazolium bis(trifluoromethylsulfonyl)imide ([EMI][TFSI]).

For example, the conductive material may include a carbon nanotube (CNT) network, a polymer dopant which is at least one of polyacrylic acid (PAA) or polyamide (PA) as a P-type dopant, or at least one of polyethylenimine (PEI), polyvinylpyrrolidone (PVP), poly(4-vinylpyridine) (PVPy), or tetronic polymer, and an ionic liquid, and in this case, the polymer dopant may be contained in an amount of 1 wt % to less than 30 wt % with respect to the total weight of the carbon nanotubes (CNTs) and the ionic liquid may be contained in an amount of 1 wt % to 20 wt % with respect to the total weight of the carbon nanotubes (CNTs).

The conductive material with high stretchability may be in the form of ink dispersed in an organic solvent and may preferably be in the form of free-form ink having viscoelasticity.

In addition, the conductive material with high stretchability may be in the form of a film.

In yet another aspect, provided is a thermoelectric material with high stretchability, including the conductive material with high stretchability.

The thermoelectric material according to an embodiment comes with the benefit of excellent thermoelectric properties.

Specifically, with the addition of polymer dopants, the thermoelectric material according to an embodiment may have improved electrical conductivity compared to carbon nanotubes, and exhibit improved thermoelectric properties as thermal conductivity is reduced due to a phonon scattering effect at a heterogeneous interface between the carbon nanotubes and the polymer dopants.

Accordingly, the thermoelectric material may apply to thermoelectric elements in which thermoelectric properties are required, and as a highly stretchable thermoelectric material, the thermoelectric material may particularly be applied to flexible thermoelectric elements and stretchable thermoelectric elements in which high electrical conduction stability according to stretching is required along with the thermoelectric properties.

In addition, the thermoelectric material according to an embodiment comes with the benefits of excellent stretchability and electrical conductivity, along with excellent thermoelectric properties.

In yet another aspect, provided is a thermoelectric element including the thermoelectric material with high stretchability.

In yet another aspect, provided is a method for preparing a conductive material with high stretchability, including mixing a carbon nanotube (CNT) network and a polymer dopant, not an elastomer, providing an increase in free-volume of the carbon nanotube (CNT) network, wherein the method prepares the conductive material with high stretchability.

Hereinafter, a method for preparing a conductive material with high stretchability according to an embodiment will be described in detail with reference to the drawings.

Figure 5:
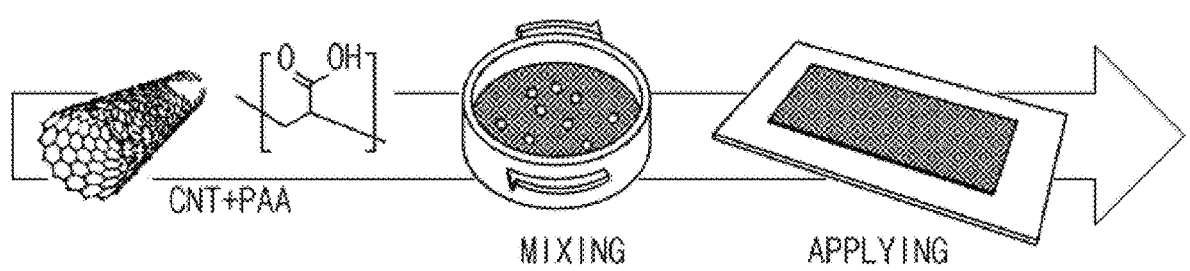
FIG. 5 is a view schematically showing a method for preparing a conductive material using conductive materials according to Examples 1 to 4.

FIG. 5 is a view schematically showing a method for preparing a conductive material according to an embodiment.

Referring to FIG. 5, the preparation method according to an embodiment includes
mixing a carbon nanotube (CNT) network and a polymer dopant, not an elastomer, providing an increase in free-volume of the carbon nanotube (CNT) network.

In this case, the polymer dopant is a polymer dopant that increases the free-volume of the carbon nanotube (CNT) network, and is not an elastomer.

The polymer dopant is contained in an amount of 1 wt % to less than 30 wt % with respect to the total weight of the carbon nanotubes (CNTs).

The polymer dopant may be a dopant that dopes the carbon nanotubes (CNTs) N-type or P-type, and may preferably be at least one of polyacrylic acid (PAA), polyamide (PA), polyethylenimine (PEI), polyvinylpyrrolidone (PVP), poly(4-vinylpyridine) (PVPy), or tetronic polymer, more preferably polyacrylic acid (PAA) having a molecular weight of 1 KDa to 10,000 KDa, even more preferably polyacrylic acid (PAA) having a molecular weight of 1 KDa to 100 KDa.

In this case, the mixing step may involve hybridizing a carbon nanotube (CNT) network, the polymer dopant, and an ionic liquid.

The mixing may be performed by preparing a solution in which a carbon nanotube (CNT) network, the polymer dopant, and an ionic liquid are mixed with an organic solvent, and then mixing the solution.

In this case, the organic solvent is not particularly limited as long as it is an organic solvent that uniformly disperses the carbon nanotube (CNT) network, the polymer dopant, and the ionic liquid, and for example, diethylene glycol may be used, and preferably a non-volatile organic solvent having low vapor pressure may be used.

In addition, the mixing may be performed through various methods of hybridizing solutions, but may preferably be performed through ball milling for more homogeneous mixing, and in this case, the ball milling may be performed using planetary mill, shaker mill, vibratory mill, SPEX mill, attritor mill, and the like.

The preparation method according to an embodiment may further include forming the resulting mixture on a substrate.

In this case, the substrate preferably has at least one of stretchability or flexibility.

The substrate, as a flexible substrate, may be at least one selected from the group consisting of polyethylene terephthalate (PET), polyimide (PI), polyethersulphone (PES), polyacrylate (PAR), polyetherimide (PET), polyethylene naphthalate (PEN), polyphenylene sulfide (PPS), polyallylate, polycarbonate (PC), cellulose triacetate (TAC), and cellulose acetate propionate (CAP), but is not limited thereto, and a variety of materials having flexibility may be used as the substrate.

In addition, the substrate, as a stretchable polymer substrate having stretchability, may be at least one selected from the group consisting of ECO-FLEX, polydimethylsiloxane (PDMS), polyurethane (PU), polyisoprene, polybutadiene, acrylonitrile butadiene rubber (NBR), and styrene-butadiene rubber (SBR), but is not limited thereto, and a variety of materials having stretchability may be used as the substrate.

The preparation method according to an embodiment may further include drying.

The drying involves removing a solvent in the applied solution and may be performed by maintaining the substrate at a predetermined temperature of 25° C. or higher in vacuum.

In this case, for smooth solvent removal, the substrate may be maintained at 25° C. to 100° C., 40° C. to 90° C., and preferably 70° C. to 90° C.

Hereinafter, the present invention will be described in detail through Examples and Experimental Examples.

However, the following Examples and Experimental Examples are illustrative of the present invention, and the contents of the present invention are not limited by the following Examples.

Embodiment 1

Step 1: A solution of single-walled carbon nanotubes (SWCNTs) and polyacrylic acid (PAA) having a molecular weight of 3000 kDa in a diethylene glycol solvent was hybridized through planetary ball milling at 600 rpm for 30 minutes to prepare a mixed solution.

In this case, the solution contains polyacrylic acid (PAA) in an amount of 18 wt % with respect to the total weight of the single-walled carbon nanotubes.

Step 2: The mixed solution was applied onto a PDMS substrate through blade casting or printing, and dried at 80° C. for 18 hours to prepare a conductive film.

Embodiment 2

A conductive film was prepared in the same manner as in Example 1, except that a solution of single-walled carbon nanotubes (SWCNTs), polyacrylic acid (PAA) having a molecular weight of 3000 kDa, and 1-ethyl-3-methylimidazolium bis(trifluoromethylsulfonyl)imide ([EMI][TFSI]) in a diethylene glycol solvent was used as a solution from step 1 of Example 1.

In this case, the solution contains polyacrylic acid (PAA) in an amount of 18 wt % with respect to the total weight of the single-walled carbon nanotubes, and 1-ethyl-3-methylimidazolium bis(trifluoromethylsulfonyl)imide ([EMI][TFSI]) in an amount of 10 wt % with respect to the total weight of the single-walled carbon nanotubes.

Embodiment 3

A conductive film was prepared in the same manner as in Example 1, except that polyacrylic acid (PAA) having a molecular weight of 1.8 kDa was used instead, from Example 1.

Embodiment 4

A conductive film was prepared in the same manner as in Example 1, except that polyacrylic acid (PAA) having a molecular weight of 1.8 kDa was used instead, from Example 2.

Comparative Example 1

A conductive film was prepared in the same manner as in Example 1, except that a solution of single-walled carbon nanotubes (SWCNTs) in a diethylene glycol solvent without polyacrylic acid (PAA) was used as a solution from step 1 of Example 1.

Experimental Example 1

In order to determine changes in shape and resistance ($\Delta R/R0$) according to tensile strain of conductive films according to Examples, tensile tests were performed on the conductive films of Examples 1 to 4 and Comparative Example 1, and the results are shown in FIGS. 6 to 9.

Figure 6:
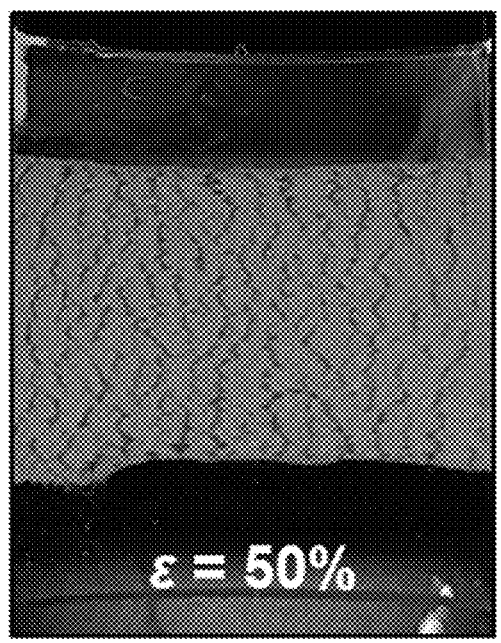
FIG. 6 is an image showing a conductive film of Comparative Example 1 stretched to have a tensile strain of 50%.
Figure 7:
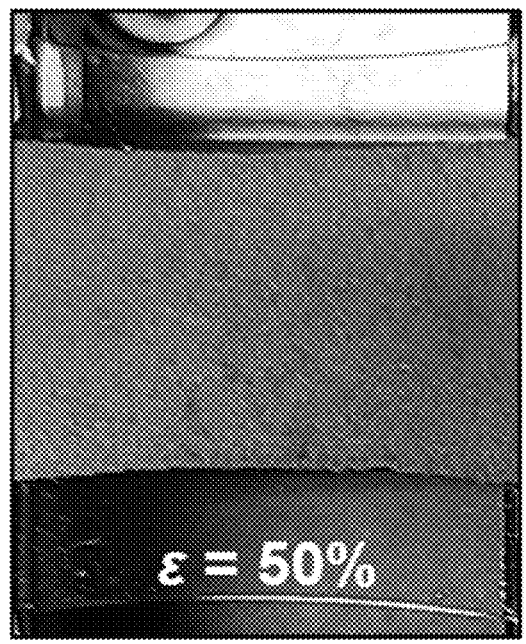
FIG. 7 is an image showing a conductive film of Example 1 stretched to have a tensile strain of 50%.

FIG. 6 is an image showing a conductive film of Comparative Example 1 stretched to have a tensile strain of 50%, and FIG. 7 is an image showing a conductive film of Example 1 stretched to have a tensile strain of 50%.

As shown in FIGS. 6 and 7, when the conductive film of Comparative Example 1 was stretched to have a tensile strain of 50%, a large amount of cracks occurred while the conductive film of Example 1 was stretched to have relatively significantly fewer cracks and almost no cracks.

The above results show that the inclusion of PAA along with CNTs may significantly improve stretchability, and thus may be attributed to the increase in free-volume of the carbon nanotube (CNT) network through the addition of PAA.

Figure 8:
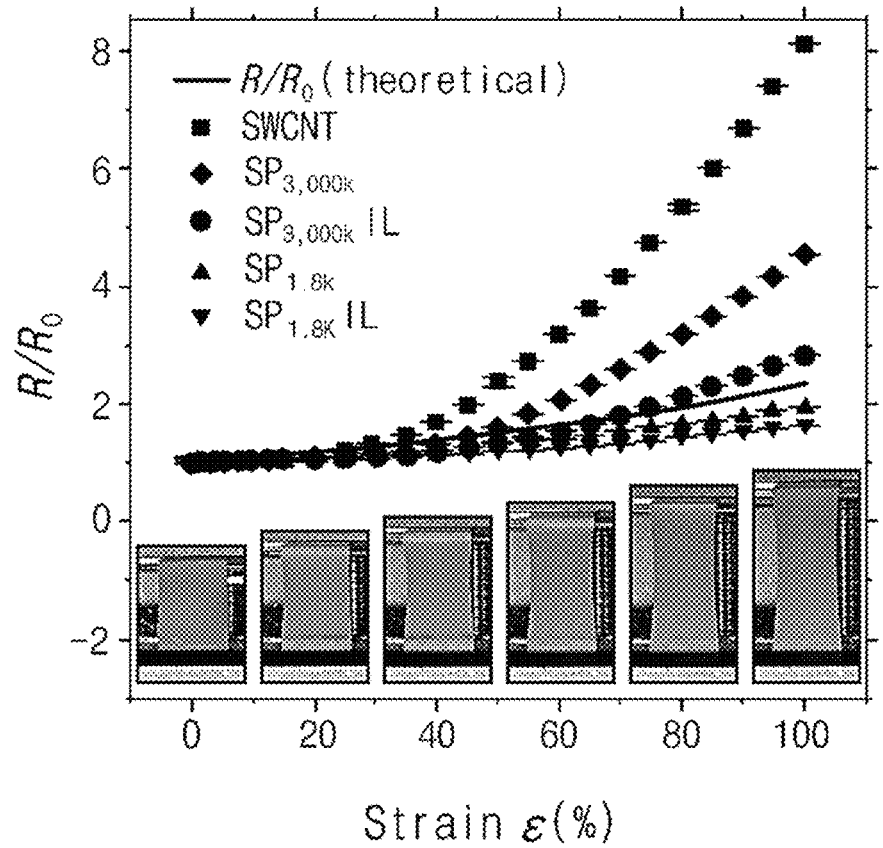
FIG. 8 is a graph showing changes in resistance (ΔR/R0) according to the tensile strain of conductive films of Examples 1 to 4 and Comparative Example 1.

FIG. 8 is a graph showing changes in resistance ($\Delta R/R0$) according to the tensile strain of conductive films of Examples 1 to 4 and Comparative Example 1.

As shown in FIG. 8, it is determined that the resistance change ($\Delta R/R0$) according to tensile strain is smaller in the conductive films of Examples 1 to 4 than in the conductive film of Comparative Example 1, and in particular, the resistance change ($\Delta R/R0$) according to tensile strain is smaller when PAA having a smaller molecular weight of 1.8 kDa is included (Examples 3 and 4) than when PAA having a molecular weight of 3000 kDa is included (Examples 1 and 2). In addition, it is shown that the resistance change ($\Delta R/R0$) according to tensile strain is smaller when the ionic liquid [EMI][TFSI] is included (Examples 2 and 4) than when the ionic liquid [EMI][TFSI] is not included (Examples 1 and 3), and the resistance change ($\Delta R/R0$) according to tensile strain is the lowest when PAA having a molecular weight of 1.8 kDa is included and the ionic liquid [EMI][TFSI] is included (Example 4).

The above results show that when PAA is included along with CNTs, and the included PAA has a smaller molecular weight, stretchability and electrical conduction stability resulting from stretching may be further improved, and this is believed to be because PAA having a smaller molecular weight is provided with better properties in increasing the free-volume of the carbon nanotube (CNT) network.

In addition, it is shown that the electrical conduction stability resulting from stretching may be further improved by further including an ionic liquid along with CNTs and PAA, and this is believed to be because aggregation of carbon nanotubes is suppressed through the ionic liquid.

Figure 9:
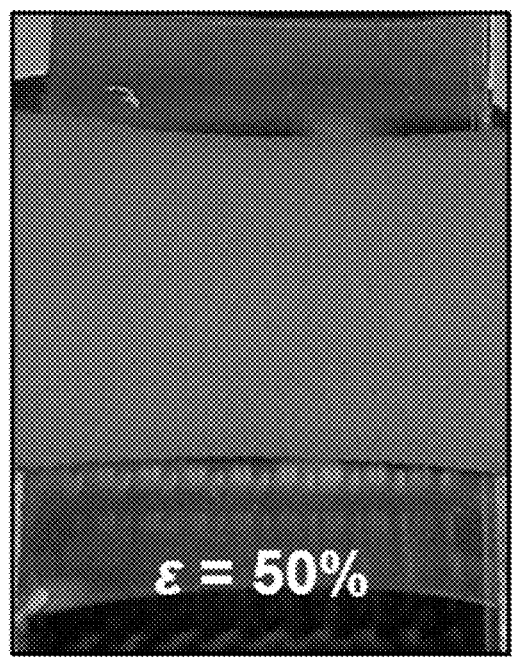
FIG. 9 is an image showing a conductive film of Example 4 stretched to have a tensile strain of 50%.

In addition, FIG. 9 is an image showing the conductive film of Example 4 stretched to have a tensile strain of 50%, and comparing FIGS. 6, 7, and 9, when stretched to have a tensile strain of 50%, the conductive film of Comparative Example 1 (FIG. 2) is shown to have a great deal of cracks while the conductive film of Example 1 (FIG. 3) is shown to have relatively few cracks and the conductive film of Example 4 (FIG. 5) is shown to have almost no cracks. The above results show that the conductive films including PAA along with CNTs (Examples 1 to 4) have greater stretchability than the conductive film including only CNTs (Comparative Example 1), and the conductive film including PAA having a smaller molecular weight and an ionic liquid (Example 4) may have further improved stretchability.

Experimental Example 2

Figure 10:
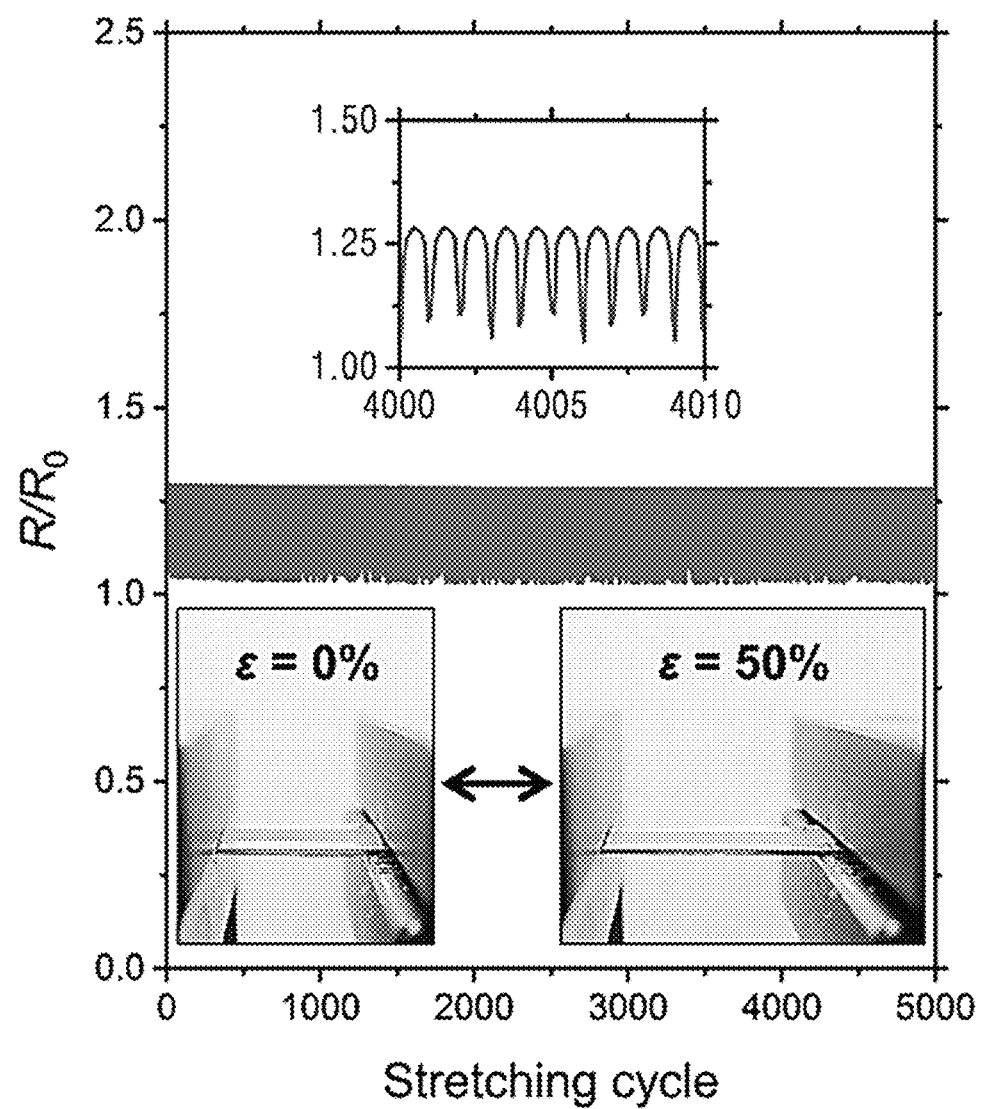
FIG. 10 is a graph showing the results of a stretching durability test in which stretching and restoration of a conductive film prepared according to Example 4 are repeated 5,000 times.
Figure 11:
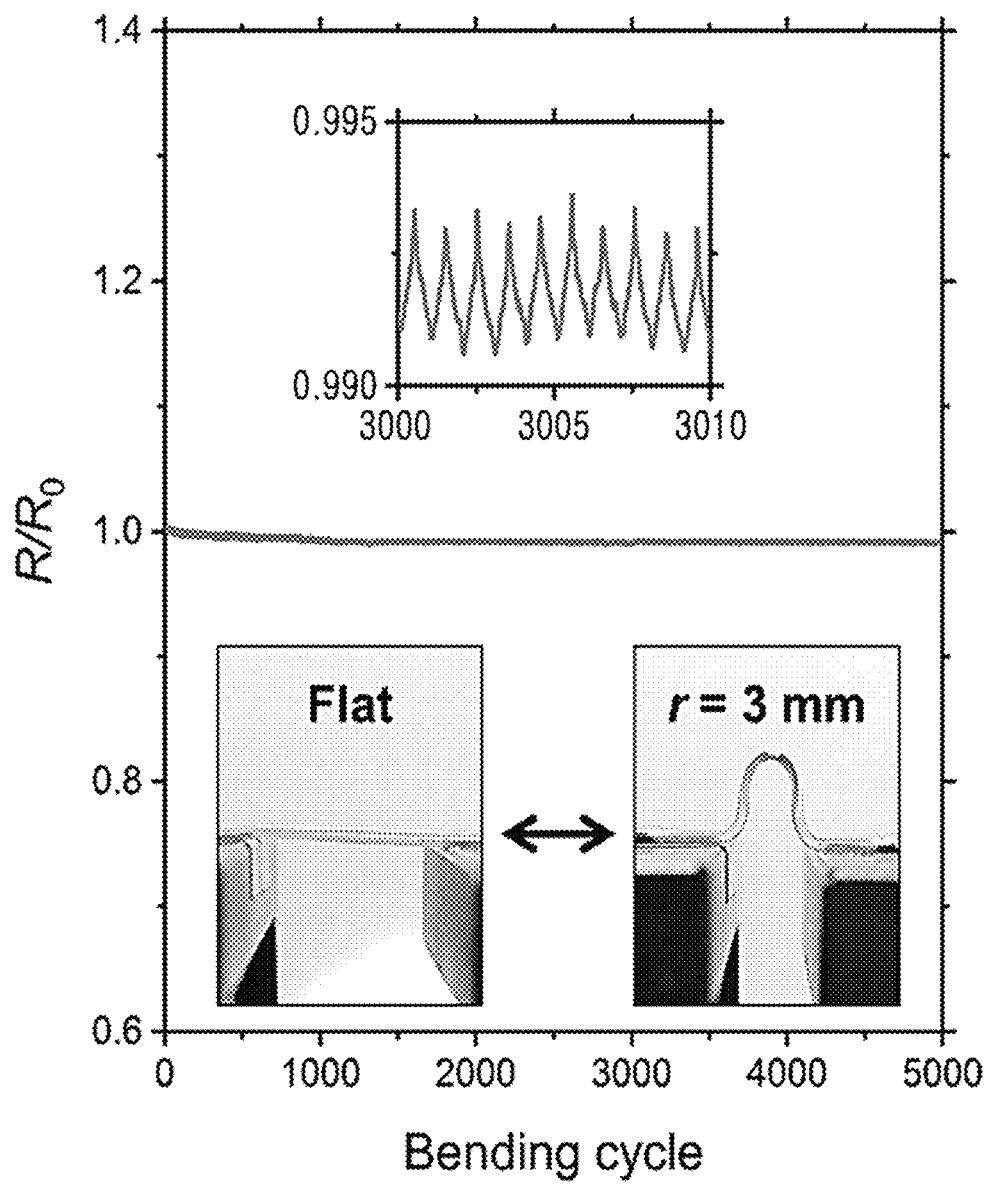
FIG. 11 is a graph showing the results of a bending durability test in which bending and restoration of a conductive film prepared according to Example 4 are repeated 5000 times.

In order to evaluate the stability against stretching and deformation of the conductive films prepared according to Examples, stretching tests repeating 5000 cycles with 0% and 50% tensile strain on the conductive film of Example 4 were performed to measure the resulting resistance change ($\Delta R/R0$), and the results are shown in FIG. 10, and bending tests repeating 5000 cycles in which the conductive film of Example 4 was flat and bent to have a bending radius (r) of 3 mm were performed to measure the resulting resistance change ($\Delta R/R0$), and the results are shown in FIG. 11.

As shown in FIGS. 10 and 11, the conductive film prepared according to Examples had little or no change in resistance ($\Delta R/R0$) to stretching and bending deformation, and these results show that as a conductive material, the conductive film prepared according to Examples has significantly excellent stability against stretching and deformation.

Experimental Example 3

Figure 12:
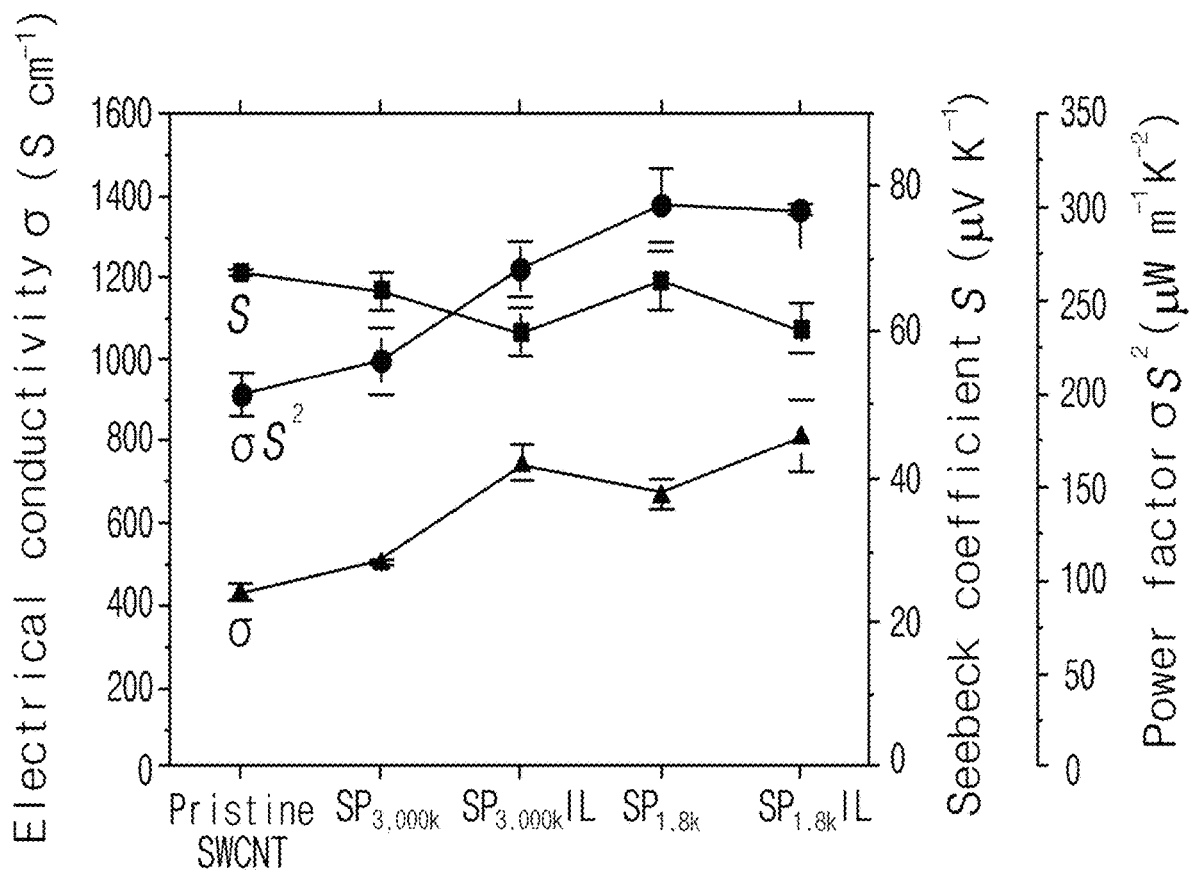
FIG. 12 is a graph showing the electrical conductivity, Seebeck coefficient, and power factor of Comparative Example 1 and Examples 1 to 4.

In order to determine thermoelectric properties of the conductive films prepared according to Examples, electrical conductivity ($\sigma$), Seebeck coefficient (S), and power factor ($\sigma S^2$) were measured for the conductive films of Comparative Example 1 and Examples 1 to 4, and the results are shown in FIG. 12.

As shown in FIG. 12, it is seen that the conductive films of Examples 1 to 4 are significantly superior in electrical conductivity and power factor to the conductive film of Comparative Example 1, and this indicates that the conductive films of Examples 1 to 4 have very excellent properties as a thermoelectric material.

In addition, it is seen that in Examples 1 to 4, the electrical conductivity may be further improved when an ionic liquid is added in a greater amount than when no ionic liquid is included, and when using a smaller molecular weight, the power factor may be further improved.

A conductive material of the present invention is a carbon nanotube (CNT)-based composite material and has improved conductivity, stretchability, and stretch stability.

In addition, the conductive material of the present invention suppresses the aggregation of carbon nanotubes (CNTs) and thus has improved stretchability and conductivity.

Accordingly, the conductive material of the present invention is highly usable as a conductive material required to have stretchability, such as conductive ink, stretchable-conductive fiber, and smart textile.

In addition, the conductive material of the present invention shows excellent electrical conductivity and power factor and thus is provided with excellent performance as a thermoelectric material.

The effects of the present invention are not limited to the aforesaid, but other effects not described herein will be clearly understood by those skilled in the art from descriptions below.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a material, is understood to encompass those compositions and methods consisting essentially of and consisting of the recited components or elements.

One of ordinary skill in the art will appreciate that starting materials, elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A conductive material with stretchability, comprising:
a carbon nanotube (CNT) network; and
a polymer dopant, not an elastomer, providing an increase in free-volume of the carbon nanotube (CNT) network, wherein the polymer dopant is a P-type dopant that dopes the carbon nanotuves (CNTs) into P-type, and
wherein the conductive material comprises the polymer dopant in an amount of 1 wt % to less than 30 wt % with respect to the total weight of the carbon nanotubes (CNTs) and has stretchability.

2. The conductive material as set forth in claim 1, wherein the polymer dopant is at least one of polyacrylic acid (PAA) or polyamide (PA).

3. The conductive material as set forth in claim 1, wherein the polymer dopant is polyacrylic acid (PAA) having a molecular weight of 1 KDa to 10,000 KDa.

4. The conductive material as set forth in claim 1, wherein the polymer dopant is polyacrylic acid (PAA) having a molecular weight of 1 KDa to 100 KDa.

5. The conductive material as set forth in claim 1, wherein the conductive material further comprises an ionic liquid (IL).

6. The conductive material as set forth in claim 5, comprising the ionic liquid (IL) in an amount of 1 wt % to 20 wt % with respect to the total weight of the carbon nanotubes (CNTs).

7. The conductive material as set forth in claim 5, wherein the ionic liquid is at least one selected from the group consisting of 1-ethyl-3-methylimidazolium bis(trifluoromethylsulfonyl)imide ([EMI][TFSI]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]), 1-butyl-1-methylpyrrolidinium bis(trifluoromethylsulfonyl)imide ([BMPYR][TFSI]), 1-butyl-1-methylpyrrolidinium tris(pentafluoroethyl)trifluorophosphate ([BMPYR][FAP]), 1-ethyl-3-methylimidazolium tris(pentafluoroethyl)trifluorophosphate ([EMI][FAP]), 1-ethyl-3-methylimidazolium bis(fluorosulfonyl)imide ([EMI][FSI]), and ethyl-dimethyl-propylammotium bis (trifluoromethylsulfonyl)imide ([EDMPA][TFSI]).

8. The conductive material as set forth in claim 1, wherein the polymer dopant is at least one of polyacrylic acid (PAA) or polyamide (PA), and the conductive material further comprises an ionic liquid (IL).

9. The conductive material as set forth in claim 1, wherein the conductive material is in the form of ink dispersed in an organic solvent.

10. The conductive material as set forth in claim 1, wherein the conductive material is in the form of a film.

11. A stretchable electrode comprising the conductive material with stretchability of claim 1.

12. A thermoelectric material with high stretchability, comprising the conductive material with stretchability of claim 1.

13. A method for preparing a conductive material with stretchability, comprising hybridizing a carbon nanotube (CNT) network and a polymer dopant, not an elastomer, providing an increase in free-volume of the carbon nanotube (CNT) network, wherein the method prepares the conductive material with stretchability of claim 1.

14. The method as set forth in claim 13, wherein the hybridizing involves dispersing the carbon nanotube (CNT) network and the polymer dopant in an organic solvent.

15. The method as set forth in claim 13, further comprising forming a mixture resulting from the hybridizing on a substrate.

\* \* \* \* \*